(12) United States Patent
Bhatnagar et al.

(10) Patent No.: US 7,964,518 B1
(45) Date of Patent: Jun. 21, 2011

(54) ENHANCED BALLISTIC PERFORMANCE OF POLYMER FIBERS

(75) Inventors: Ashok Bhatnagar, Richmond, VA (US);
Brian D. Arvidson, Chester, VA (US);
Chok Bin C. Tan, Richmond, VA (US);
Lori L. Wagner, Richmond, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/763,169

(22) Filed: Apr. 19, 2010

(51) Int. Cl.
*B32B 27/04* (2006.01)
(52) U.S. Cl. .............................. 442/134; 2/2.5; 89/36.05
(58) Field of Classification Search ...... 2/2.5; 89/36.05; 428/911; 442/134, 135
See application file for complete search history.

(56) References Cited

U.S. PATENT DOCUMENTS

| | | | |
|---|---|---|---|
| 4,403,012 A | 9/1983 | Harpell et al. | 428/290 |
| 4,413,110 A | 11/1983 | Kavesh et al. | 526/348.1 |
| 4,422,993 A | 12/1983 | Smith et al. | 264/210.8 |
| 4,430,383 A | 2/1984 | Smith et al. | 428/364 |
| 4,436,689 A | 3/1984 | Smith et al. | 264/204 |
| 4,440,711 A | 4/1984 | Kwon et al. | 264/185 |
| 4,457,985 A | 7/1984 | Harpell et al. | 428/224 |
| 4,535,027 A | 8/1985 | Kobashi et al. | 428/364 |
| 4,536,536 A | 8/1985 | Kavesh et al. | 524/462 |
| 4,545,950 A | 10/1985 | Motooka et al. | 264/210.6 |
| 4,551,296 A | 11/1985 | Kavesh et al. | 264/177 |
| 4,612,148 A | 9/1986 | Motooka et al. | 264/49 |
| 4,613,535 A | 9/1986 | Harpell et al. | 428/113 |
| 4,617,233 A | 10/1986 | Ohta et al. | 428/364 |
| 4,623,574 A | 11/1986 | Harpell et al. | 428/113 |
| 4,650,710 A | 3/1987 | Harpell et al. | 428/263 |
| 4,663,101 A | 5/1987 | Kavesh et al. | 264/178 |
| 4,737,402 A | 4/1988 | Harpell et al. | 428/252 |
| 4,748,064 A | 5/1988 | Harpell et al. | 428/113 |
| 4,916,000 A | 4/1990 | Li et al. | 428/105 |
| 5,032,338 A | 7/1991 | Weedon et al. | 264/203 |
| 5,075,904 A | 12/1991 | Shirasaki et al. | 2/412 |
| 5,180,880 A | 1/1993 | Zufle | 89/36.02 |
| 5,225,241 A | 7/1993 | Dischler | 427/121 |
| 5,246,657 A | 9/1993 | Yagi et al. | 264/210.6 |
| 5,286,435 A | 2/1994 | Slutsker et al. | 264/205 |
| 5,342,567 A | 8/1994 | Chen et al. | 264/203 |
| 5,395,671 A * | 3/1995 | Coppage et al. | 428/102 |
| 5,552,208 A | 9/1996 | Lin et al. | 428/113 |
| 5,578,374 A | 11/1996 | Dunbar et al. | 428/364 |
| 5,587,230 A | 12/1996 | Lin et al. | 428/245 |
| 5,635,288 A | 6/1997 | Park | 428/105 |
| 5,736,244 A | 4/1998 | Kavesh et al. | 428/364 |
| 5,741,451 A | 4/1998 | Dunbar et al. | 264/103 |
| 5,810,954 A | 9/1998 | Jacobs et al. | 156/62.4 |
| 5,935,881 A | 8/1999 | Abiru et al. | 442/97 |
| 5,958,582 A | 9/1999 | Dunbar et al. | 428/364 |
| 5,972,498 A | 10/1999 | Kavesh et al. | 428/364 |
| 6,287,688 B1 | 9/2001 | Howell et al. | 428/364 |
| 6,333,106 B2 | 12/2001 | Howell et al. | 428/364 |
| 6,448,359 B1 | 9/2002 | Kavesh | 526/352 |
| 6,642,159 B1 | 11/2003 | Bhatnagar et al. | 442/134 |
| 6,672,047 B2 | 1/2004 | Howell et al. | 57/284 |
| 6,746,975 B2 | 6/2004 | Kavesh | 442/135 |
| 6,841,492 B2 | 1/2005 | Bhatnagar et al. | 442/135 |
| 6,846,758 B2 | 1/2005 | Bhatnagar et al. | 442/135 |
| 6,967,057 B2 | 11/2005 | Chang et al. | 428/364 |
| 6,969,553 B1 | 11/2005 | Tam et al. | 428/364 |
| 7,078,099 B1 | 7/2006 | Tam et al. | 428/394 |
| 7,344,668 B2 | 3/2008 | Tam et al. | 264/210.8 |
| 7,407,900 B2 | 8/2008 | Cunningham | 442/135 |
| 7,498,276 B2 | 3/2009 | Wagner et al. | 442/59 |
| 2008/0075933 A1 * | 3/2008 | Rovers | 428/196 |
| 2009/0321976 A1 | 12/2009 | Nguyen et al. | 264/78 |

FOREIGN PATENT DOCUMENTS

| | | |
|---|---|---|
| DE | 3817800 | 9/1989 |
| EP | 412452 | 2/1991 |
| JP | 59-216913 | 12/1984 |
| JP | 03-069605 | 3/1991 |
| JP | 06-278135 | 10/1994 |
| WO | WO 00/48821 | 8/2000 |
| WO | WO2009096956 | 8/2009 |

OTHER PUBLICATIONS

Russell, S.J., et al. "Formation and properties of fluid jet entangled HMPE impact resistant fabrics."; *Composites Sciende and Technology*; vol. 65, n. 6, pp. 899-907, May 2005.

Cordova, David S., et al. "Review of ultra high modulus polyethylene fiber reinforced composites for Electromagnetic window applications."; *International SAMPE Symposium and Exhibition*; vol. 37, pp. 1406-1420, 1992 (37th International SAMPE Symposium, Mar. 9-12, 1992).

Savitskii, et al. "Model of the Orientation Reinforcement of Polymers and the Preparation of High-Strength Polyethylene Fibres." *Polymer Science USSR*, vol. 26, No. 9, pp. 2007-2016, 1984.

* cited by examiner

*Primary Examiner* — Arti Singh-Pandey
(74) *Attorney, Agent, or Firm* — Erika S. Wilson

(57) ABSTRACT

Ballistic resistant materials having improved strength and lighter weights. More particularly, improved ballistic resistant fabrics produced from drawn, high modulus fibers having a reduced fiber diameter and improved physical strength properties, without changing other properties such as fiber chemistry, binder resin type and binder resin content. The fabrics incorporate low denier per filament monofilament fibers, low denier per filament multifilament fibers, or a combination of low denier per filament monofilament fibers and low denier per filament multifilament fibers in a specialized fabric construction to form fine fiber layers and fabrics having enhanced strength and fiber areal density without altering the fabric weight, or having reduced fabric weight without a corresponding reduction in ballistic performance.

20 Claims, No Drawings

ENHANCED BALLISTIC PERFORMANCE OF POLYMER FIBERS

BACKGROUND OF THE INVENTION

1. Field of the Invention

This invention relates to ballistic resistant materials having improved strength and lighter weights. More particularly, the invention pertains to improved ballistic resistant fabrics produced from drawn, high modulus fibers having a reduced fiber diameter and improved physical strength properties, without requiring modification of other properties such as fiber chemistry, binder resin type and binder resin content.

2. Description of the Related Art

Ballistic resistant articles containing high strength fibers that have excellent properties against projectiles are well known. Articles such as bullet resistant vests, helmets, vehicle panels and structural members of military equipment are typically made from fabrics comprising high strength fibers. High strength fibers conventionally used include polyethylene fibers, aramid fibers such as poly(phenylenediamine terephthalamide), graphite fibers, nylon fibers, glass fibers and the like. For many applications, such as vests or parts of vests, the fibers may be used in a woven or knitted fabric. For other applications, the fibers may be encapsulated or embedded in a polymeric binder material to form woven or non-woven rigid or flexible fabrics.

There are a number of parameters that affect the performance of a ballistic resistant material, and various ballistic resistant constructions are known that are useful for the formation of hard or soft armor articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference to the extent not incompatible herewith, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

Particular parameters that affect the level of ballistic protection and the effectiveness of the ballistic resistant material include fiber construction, fiber surface, binder resin and binder resin content. However, fibers are the backbone of a ballistic material have the most significant impact on the effectiveness of a fabric in defending against penetration by fragments and bullets. High molecular weight, high modulus polyethylene filaments and fibers are particularly desirable materials to form such composite structures because they have very high strength to weight performance. They have a sufficiently high tensile modulus and tenacity to offer superior ballistic protection to a user, and sufficiently low weight to produce materials that are desirable to wear.

Many different techniques are known for the fabrication of high tenacity polyethylene filaments and fibers. Typically, such high tenacity polyethylene fibers are made by a spinning a solution containing ultra-high molecular weight polyethylene (UHMWPE) swelled with a suitable solvent into filaments of ultrahigh molecular weight polyethylene, followed by cooling the solution filaments to a gel state, then removing the spinning solvent. One or more of the solution filaments, the gel filaments and the solvent-free filaments are stretched or drawn to a highly oriented state in one or more stages. In general, such filaments are known as "gel-spun" polyethylene filaments. The gel spinning process discourages the formation of folded chain lamellae and favors formation of "extended chain" structures that more efficiently transmit tensile loads. Gel-spun filaments also tend to have melting points higher than the melting point of the polymer from which they were formed. For example, high molecular weight polyethylene of about 150,000, about one million and about two million molecular weight generally have melting points in the bulk of 138° C. Highly oriented polyethylene filaments made of these materials have melting points of from about 7° C. to about 13° C. higher. This slight increase in melting point reflects the crystalline perfection and higher crystalline orientation of the filaments as compared to the bulk polymer.

Various methods for forming gel-spun polyethylene filaments have been described, for example, in U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,746,975; 6,969,553; 7,078,099 and 7,344,668, all of which are incorporated herein by reference to the extent not incompatible herewith. For example, U.S. Pat. Nos. 4,413,110, 4,663,101 and 5,736,244 describe the formation polyethylene gel precursors and the stretching of low porosity xerogels obtained therefrom to form high tenacity, high modulus fibers. U.S. Pat. Nos. 5,578,374 and 5,741,451 describe post-stretching a polyethylene fiber which has already been oriented by drawing at a particular temperature and draw rate. U.S. Pat. No. 6,746,975 describes high tenacity, high modulus multifilament yarns formed from polyethylene solutions via extrusion through a multi-orifice spinneret into a cross-flow gas stream to form a fluid product. The fluid product is gelled, stretched and formed into a xerogel. The xerogels is then subjected to a dual stage stretch to form the desired multifilament yarns. U.S. Pat. No. 7,078,099 describes drawn, gel-spun multifilament polyethylene yarns having increased perfection of molecular structure. The yarns are produced by an improved gel spinning process and are drawn under specialized conditions to achieve multifilament yarns having a high degree of molecular and crystalline order. U.S. Pat. No. 7,344,668 describes a process for drawing essentially diluent-free gel-spun polyethylene multifilament yarns in a forced convection air oven and the drawn yarns produced thereby. The process conditions of draw ratio, stretch rate, residence time, oven length and feed speed are selected in specific relation to one another so as to achieve enhanced efficiency and productivity.

However, with the constantly broadening scope of ballistic threats, and the rapid expansion of people that feel a need to protect themselves from such threats, there is an ongoing need in the art to reduce the weight of ballistic resistant materials without reducing the effectiveness of the materials in defending against ballistic threats. The invention provides a solution to this need in the art, incorporating a plurality of high strength, low denier per filament monofilament fibers, a plurality of high strength, low denier multifilament fibers, or a combination of a plurality of high strength, low denier monofilament fibers and a plurality of high strength, low denier multifilament fibers in a specialized fabric construction to form thin and fine fiber layers and fabrics having excellent fiber spreading, enhanced strength and suitable fiber areal density without altering the overall fabric weight. These improved fabrics provide the end user the choice of selecting fabrics having improved ballistic performance with no increase in fabric weight, or reduced fabric weight without a corresponding reduction in ballistic performance. Each of the patents discussed herein represent advances in the state of the art, but none satisfy the needs met by the present invention.

SUMMARY OF THE INVENTION

The invention provides a ballistic resistant composite comprising at least one layer of interconnected fibers, said fibers optionally having a polymeric binder material thereon, said optional binder material substantially coating the outer surfaces of each of the fibers and interconnecting said fibers, which fibers comprise monofilament fibers and/or multifilament fibers, said fibers having a diameter of less than about 4.6 denier per filament (dpf; denier/filament), a tenacity of at least about 37 grams per denier, a tensile modulus of at least about 1400 grams per denier, an elongation to break of at least about 2% and a fiber areal density of at least about 5 grams/$m^2$.

The invention also provides a ballistic resistant fabric formed from a plurality of layers of interconnected fibers, said fabric comprising a plurality of non-woven fiber layers, each fiber layer comprising a plurality of fibers arranged in a substantially parallel array, said fibers comprising monofilament fibers and/or multifilament fibers, said fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/$m^2$, said fibers having a polymeric binder material thereon, said binder material substantially coating the outer surfaces of each of the fibers and interconnecting said fibers, wherein each non-woven fiber layer has a fiber areal density of from about 5 g/$m^2$ to about 35 g/$m^2$, and wherein the fabric has an areal density of less than about 75 g/$m^2$.

The invention further provides a method of producing a ballistic resistant material from a plurality of layers of high strength fibers, the method comprising:

a) forming at least two fiber layers, each fiber layer comprising a plurality of fibers aligned in a substantially parallel, unidirectional array;

b) drawing one or more of said fibers under conditions sufficient to reduce the diameter of said fibers, producing drawn fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/$m^2$;

c) after both steps a) and b) are completed, coating said fibers with a polymeric binder material such that said binder material substantially coats the outer surfaces of each of the fibers and interconnects said fibers; and thereafter d) consolidating said fiber layers to form a ballistic resistant material.

DETAILED DESCRIPTION OF THE INVENTION

The invention provides ballistic resistant materials having improved strength and lighter weight ratios by fabricating ballistic resistance fabrics from highly drawn, high modulus fibers having a reduced fiber diameter and improved physical strength properties. The fabrics and articles formed therefrom maintain superior ballistic penetration resistance without changing other properties such as fiber chemistry, binder resin type and binder resin content.

For the purposes of the invention, articles that have superior ballistic penetration resistance describe those which exhibit excellent properties against deformable projectiles, such as bullets, and against penetration of fragments, such as shrapnel.

The invention provides ballistic resistant composites formed from one or more fiber layers comprising low denier per filament monofilament fibers, low denier per filament multifilament fibers, or a combination of low denier per filament monofilament fibers and low denier per filament multifilament fibers to form at least one layer of interconnected fibers. The ballistic resistant composites may be woven or non-woven fabrics, and the fibers forming said fabrics may optionally be coated with a polymeric binder material.

As used herein, the term "composite" refers to combinations of fibers optionally with a binder/matrix coating. Such is conventionally known in the art. As used herein, a "layer" of fibers describes a substantially planar arrangement of fibers interconnected by weaving or interconnected in a non-woven structure. As used herein, a fiber "ply" or "single ply" is an arrangement of non-overlapping or partially overlapping fibers that are aligned in a single unidirectional, substantially parallel array. This type of fiber arrangement is also known in the art as a "unitape" (unidirectional tape), and multiple plies may be combined to form a non-woven fabric. For example, multiple fiber plies may be formed into non-woven fabrics that comprise a plurality of stacked, overlapping fiber plies that are consolidated into a single-layer, monolithic element. As used herein, a layer of fibers may include one or more plies (unitapes). Additionally, as used herein, an "array" describes an orderly arrangement of fibers or yarns, and a "parallel array" describes an orderly parallel arrangement of fibers or yarns. As used herein, a "fabric" may relate to either a woven or non-woven material, or a combination thereof, and the term "fabric" describes structures that may include multiple fiber plies either before or after molding to form a consolidated non-woven composite. As used herein, the terms "drawn" fibers or "drawing" fibers are known in the art, and are also known in the art as "oriented" or "orienting" fibers or "stretched" or "stretching" fibers. These terms are used interchangeably herein.

For the purposes of the present invention, a "fiber" is an elongate body the length dimension of which is much greater than the transverse dimensions of width and thickness. The cross-sections of fibers for use in this invention may vary widely, and they may be circular, flat or oblong in cross-section. Thus the term "fiber" includes filaments, ribbons, strips and the like having regular or irregular cross-section, but it is preferred that the fibers have a substantially circular cross-section. As used herein, the term "yarn" is defined as a single strand consisting of multiple fibers.

A described herein, a single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. The definition of multifilament fibers herein also encompasses pseudo-monofilament fibers, which is a term of art describing multifilament fibers that are at least partially fused together and look like monofilament fibers. Multifilament fibers of the invention preferably include from 2 to about 500 filaments, more preferably from 2 to 250 filaments, more preferably from 2 to 100 filaments, more preferably from 2 to 20 filaments, more preferably from 2 to 10 filaments and most preferably from 2 to 5 filaments, said filaments being at least partially melted and fused together or twisted or braided together.

The fibers of the invention may be of irregular or regular multi-lobal cross-section having one or more regular or irregular lobes projecting from the linear or longitudinal axis of the fibers. It is preferred that the fibers are single lobed with a substantially circular cross-section. In the most preferred embodiments of the invention, the ballistic resistant materials/fabrics of the invention include one or more monofilament fibers, and preferably consist of monofilament fibers or comprise a combination of monofilament fibers and multifilament fibers. Most preferably, fabrics of the invention are formed from monofilament fibers which are touching each other.

Monofilament fibers are most preferred because, for example, a greater number of fibers may be incorporated into a unitape or fabric layer compared to a unitape or fabric layer of the same dimensions that is formed with multifilament fibers. The resulting fabrics thus have a fiber areal density less than 35 g/m$^2$ (gsm). A similar benefit is also found when using or incorporating multifilament fibers, but the improvement is not a substantial. Further, monofilament fibers are most preferred because multifilament fibers may fray at the end of the fiber after the fibers are trimmed or cut during conventional processing steps.

The ballistic resistant fabrics provided herein are formed from high-strength, high tensile modulus polymeric fibers. For the purposes of this invention, high-strength, high tensile modulus fibers may comprise any polymeric fiber type capable of being fabricated to have a diameter of less than about 4.6 denier per filament, a tenacity of at least about 37 grams per denier, a tensile modulus of at least about 1400 grams per denier, an elongation to break of at least about 2% and a fiber areal density of at least about 5 grams/m$^2$. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in). The terms tenacity, initial modulus and tensile modulus are each as measured by ASTM D2256.

Particularly preferred are monofilament fibers having a fiber denier less than about 4.6 denier per filament, more preferably from about 1 denier per filament to about 3.0 denier per filament, and most preferably from about 1.0 denier per filament to about 2.0 denier per filament, which also have said desired physical strength properties, i.e. superior tenacity, tensile modulus, elongation to break and fiber areal density. Accordingly, the preferred fibers of the invention have a diameter of from about 1 denier per filament to about 4.6 denier per filament, a tenacity of from about 37 grams per denier to about 45 grams per denier, a tensile modulus of from about 1400 grams per denier to about 3000 grams per denier, an elongation to break of at least about 2% and a fiber areal density of from about 5 grams/m$^2$ to about 35 grams/m$^2$. Most preferably, the fibers of the invention have a diameter of from about 1 denier per filament to about 2.0 denier per filament, a tenacity of from about 40 grams per denier to about 45 grams per denier, a tensile modulus of from about 2000 grams per denier to about 3000 grams per denier, an elongation to break of at least about 2% to about 3.3% and a fiber areal density of from about 25 grams/m$^2$ to about 35 grams/m$^2$. These values for initial tensile modulus and tenacity are generally obtainable only by employing solution grown or gel spinning processes, and are best obtained from a high molecular weight polyethylene bulk polymer. Accordingly, the fibers of this invention preferably comprise the high tenacity polyolefin fibers, or consist essentially of the high tenacity polyolefin fibers, or consist of the high tenacity polyolefin fibers, and the polyolefin fibers preferably are high tenacity polyethylene fibers. High tenacity polyethylene multifilament fibers are currently commercially available, for example, under the trademark SPECTRA® from Honeywell International Inc. of Morristown, N.J. However, neither monofilament fibers nor multifilament fibers having these specific collective properties are currently commercially available.

High-strength, high tensile modulus fiber materials that are particularly suitable for the formation of the ballistic resistant materials and articles are highly oriented, high molecular weight, gel-spun monofilament and multifilament polyethylene fibers. Several processes are known for preparing gel-spun UHMW PE filaments, including the methods described, for example, in U.S. Pat. Nos. 4,413,110, 4,422,993, 4,551,296, 4,663,101, 5,246,657, 5,736,244, 5,578,374, 5,741,451, 6,448,359, 6,746,975, 7,078,099 and 7,344,668, all of which are incorporated herein by reference to the extent not incompatible herewith. As described, for example, in U.S. Pat. No. 7,344,668, gel-spun polyethylene filaments are prepared from ultrahigh molecular weight polyethylene (UHMW PE) having an intrinsic viscosity in decalin at 135° C. of from 5 dl/g to 35 dl/g. The UHMW PE is dissolved in a solvent at elevated temperature, the resulting solution is extruded into a solution filament and the solution filament is cooled to a gel state. The gel state may be rubber-like if the spinning solvent is a liquid, or it may be rigid if the spinning solvent is a wax. The spinning solvent is generally removed from the gel filament by evaporation or extraction. Preferably the gel-spun polyethylene employed is a polyethylene having fewer than about one methyl group per thousand carbon atoms, more preferably fewer than about 0.5 methyl groups per thousand carbon atoms, and less than about 1 wt. % of other constituents.

The gel-spun multifilament or gel-spun monofilament polyethylene fibers of the invention are extruded through a single-orifice or multi-orifice spinneret having openings that extrude filaments having a denier per filament substantially larger than 4.6 denier per filament. Preferably, the un-drawn gel-spun filaments are spun through a multi-orifice spinneret to have a denier per filament of at least about twice the denier of the final highly drawn filaments of the invention, such that the stretching process preferably reduces the denier of the gel spun filaments by about 50% or more, more preferably by about 60% or more, even more preferably by about 70% or more and most preferably by about 80% or more, preferably reducing the denier per filament down to 3.2 dpf or less, more preferably reducing the denier per filament down to 2.0 dpf or less, and most preferably reducing the denier per filament down to 1.0 dpf or less.

To achieve these results, the gel-spun multifilament or gel-spun monofilament polyethylene fibers of the invention are stretched in a single, continuous drawing step or in multiple drawing steps. In the preferred embodiments of the invention, the filaments are drawn multiple times and drawing is conducted in a multi-stage drawing process. In a typical multi-stage drawing process, filaments/fibers are heated to an increased temperature after each drawing step compared to the prior drawing step, and where the temperature of the fiber may be increased just prior to stretching or incrementally during the stretching step. When drawing is conducted after the solvent is extracted from the filaments, the fibers may be softened in a hot air oven at a relatively high temperature, such as from about 135° C. to about 160° C., and preferably are drawn during this heating step. Any desired stretch ratio may be employed, typically at least about 2, such as from about 2 to about 10, more preferably from about 3 to about 8, and most preferably from about 4 to about 6. The fibers are heated and drawn for a desired period of time. The actual dwell time in a heating apparatus such as an oven depends on several factors, such as the temperature of the oven, the length of the oven, the type of oven (e.g., hot air circulating oven, heated bath, etc.), etc. In this regard, each drawing step in a sequence of multiple drawing steps is conducted at a draw ratio that is slower than the previous drawing step, and the stretching process is very slow, taking several days in some circumstances to stretch the fibers sufficiently with out breaking them.

In a typical drawing process for gel-spun polyethylene filaments, a plurality of gel-spun filaments are grouped together and drawn together as either a bundle of disconnected filaments or as a yarn comprising interconnected fibers. The filaments of the invention are preferably drawn as a bundle of disconnected filaments rather than as a yarn of interconnected fibers. It is also common to draw multiple packages of gel-spun polyethylene bundles or yarns on a creel simultaneously. See, for example, commonly-owned U.S. Pat. Nos. 7,078,099 and 7,344,668, which describe preferred stretching conditions. In the most preferred embodiments of the invention, drawing of the filaments is conducted under the drawing conditions specified in either commonly-owned U.S. Pat. No. 7,078,099 or commonly-owned U.S. Pat. No. 7,344,668, where either process is preferably conducted as modified to pass the filaments multiple times through the drawing apparatuses specified therein where drawing is completely stopped between the sequential drawing steps. For example, U.S. Pat. No. 7,078,099 teaches a single pass, single draw drawing process where the filaments are passed through the drawing apparatus once and are drawn once as they travel through the specified drawing apparatus. U.S. Pat. No. 7,344,668 teaches a single pass, double draw drawing process where the filaments are passed through the drawing apparatus once and are drawn twice as they travel through the specified drawing apparatus. The present inventors have now found that low denier/filament fibers having the superior properties described herein may be fabricated by modifying these processes from U.S. Pat. Nos. 7,078,099 and/or 7,344,668 by conducting multiple passes through their respective drawing apparatuses rather than a single pass.

In the preferred embodiment of the invention, the gel spun fibers are drawn by a hybrid combination of the processes of U.S. Pat. Nos. 7,078,099 and 7,344,668, or by conducting one of said processes multiple times wherein un-drawn filaments are first drawn by passing the filaments through the drawing apparatus a first time (i.e. a single pass), and then these drawn filaments are subsequently passed through the drawing apparatus at least one additional time (i.e. a second pass, third pass, etc.). Preferably, the first pass is a pass through the drawing apparatus as specified in either U.S. Pat. No. 7,078,099 or U.S. Pat. No. 7,344,668, and the second pass (and any additional passes) is also preferably a pass through the drawing apparatus as specified in either U.S. Pat. No. 7,078,099 or U.S. Pat. No. 7,344,668. For example, a single pass of un-drawn filaments through the process of U.S. Pat. No. 7,078,099 (single draw process) will result in the filaments being drawn once (according to the conditions of U.S. Pat. No. 7,078,099), and a subsequent pass of said drawn filaments through the process of U.S. Pat. No. 7,344,668 (double-draw process) will result in the filaments being drawn two more times (said second and third draws being according to the conditions of U.S. Pat. No. 7,344,668), such that the filaments are therefore drawn a total of three times. Most preferably, the filaments of the invention are subjected to just two draw passes wherein both the first pass and the second pass comprise the double-draw method specified in U.S. Pat. No. 7,344,668. As the process of U.S. Pat. No. 7,344,668 is a double-draw method, the filaments of the invention are therefore preferably drawn a total of four times. Such multiple drawing passes are not taught in either U.S. Pat. No. 7,078,099, U.S. Pat. No. 7,344,668 or in the related art, and has been found to achieve improved high performance fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/m$^2$.

As previously stated, the individual filaments comprising a multifilament fiber of the invention may be at least partially melted and fused together or twisted or braided together. As per the techniques described in U.S. published patent application 2009/0321976, the disclosure of which is incorporated herein by reference to the extent not incompatible herewith, the conditions of heating and drawing a multifilament fiber are preferably chosen such that the adjacent filaments of a multifilament yarn are at least partially fused together, where it is believed that the outer surface temperature of the filaments are at or within the melting range of the polymer constituting the filaments such that the surfaces of the filaments begin to soften and fuse at contact points along the length of the outer surfaces of the filaments. The multifilament fibers of the invention are preferably substantially untwisted. By "substantially untwisted" means that the multifilament fibers have zero twist or very little twist along their length, for example, no more than about 0.1 turns per inch (4 turns per meter), preferably no more than about 0.05 turns per inch (2 turns per meter) along the length of the multifilament fiber. If necessary, a fused multifilament fiber may be stretched again after fusing the fibers together in order to obtain a fused multifilament fiber having a multifilament denier of less than about 4.6 denier per filament, more preferably from about 1 denier per filament to about 3.0 denier per filament, and most preferably from about 1.0 denier per filament to about 2.0 denier per filament.

Neither of U.S. patents, 7,078,099 and 7,344,668 teach monofilament fibers or composites formed from monofilament fibers. For the purposes of the invention, monofilament fibers may be fabricated in a similar manner according to the methods disclosed in said patents where a polymer solution is extruded through a single spinneret opening, or by extrusion through a multi-orifice spinneret without merging individual filaments with other filaments by braiding, twisting, heat fusing or any other means. U.S. Pat. Nos. 7,078,099 and 7,344,668 also fail to describe fabrics formed with fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/m$^2$. The methods described in these patents may be modified by extending the stretching steps described therein to produce even thinner fibers having a denier per filament of less than about 4.6, more preferably from about 1.0 denier per filament to about 3.0 denier per filament, and most preferably from about 1.0 denier per filament to about 2.0 denier per filament.

Either prior to stretching the filaments/fibers or after stretching the filaments/fibers, external agents such as such as anti-static agents and spin finishes may be applied onto the filament/fiber surfaces, provided that solvents for polyethylene are not included in said materials. Such external agents would comprise less than 1 wt. % of the fiber. Additionally, prior to the application of any matrix resins or other surface coatings, it is also preferred that some or all of the fibers be subjected to an optional surface treatment for various reasons as would be determined by one skilled in the art, and in many circumstances it would be sufficient to just treat the fibers closest to the surface of a fabric rather than all or most of the fibers comprising a fabric. For example, some or all of the fibers be subjected to an optional corona treatment, plasma treatment, fluorination treatment or other chemical treatment, such as UV grafting, to improve inter-fiber adhesion between adjacent fibers during composite fabrication. For example, a corona treatment is a process in which a fiber is passed through a corona discharge station giving the surface of the fiber a charge that improves its ability to bond to an adjacent fiber. Preferably the fibers are subjected to about 0.5 to about 3 kVA-min/m$^2$ of corona treatment. More preferably, the corona treatment level is about 1.7 kVA-min/m$^2$. Suitable corona treatment units are available from Enercon Industries Corp., Menomonee Falls, Wis. and from Sherman Treaters Ltd, Thame, Oxon., UK. An optional plasma treatment, which is well known in the art, involves treating a fiber or fabric with an electric discharge in a vacuum chamber filled with either oxygen, ammonia or another appropriate inert gas as is well known in the art. The selection of gas is important for the desired surface treatment, and such would be determined by one skilled in the art. The electric discharge is by radio frequency (RF) energy which dissociates the gas into electrons, ions, free radicals and metastable products. Electrons and free radicals created in the plasma collide with the fiber surface, rupturing covalent bonds and creating free radicals on the fiber surface. After a predetermined reaction time or temperature, the process gas and RF energy are turned off and the leftover gases and other byproducts are removed. In an optional fluorination treatment, the surface of the filaments/fibers of the invention are modified by direct fluorination of the filaments/fibers with elemental fluorine. For example, the filament/fiber surfaces may be fluorinated by contacting the filament/fiber surfaces with a mixture of 10% $F_2$/90% He at 25° C. to deposit elemental fluorine on said surfaces. Composites herein may therefore be fabricated from fluorinated fibers, non-fluorinated fibers, or a combination of fluorinated and non-fluorinated fibers in a single fabric composite. UV grafting is also a well known process in the art. In an optional process of UV grafting of a ballistic fiber surface, the fibers (or fabric) are soaked in a solution of a monomer, photosensitizer and a solvent to at least partially coat the fiber/fabric surfaces with the monomer and photosensitizer. The coated fibers are then irradiated with UV irradiation, as is well known in the art. The particular selection of monomer type, photosensitizer type and solvent type will vary as desired by and readily determined by one skilled in the art. For example, acrylamide groups may be grafted onto UHMWPE polymer chains via an acrylamide grafting monomer, as discussed in the article entitled, "Studies on surface modification of UHMWPE fibers via UV initiated grafting" by Jieliang Wang, et al. of the Department of Applied Chemistry, School of Science, Northwestern Polytechnical University, Xi'an, Shaanxi 710072, PR China. Applied Surface Science, Volume 253, Issue 2, 15 Nov. 2006, pages 668-673.

Either prior to stretching the fibers or after stretching the fibers, the fibers of the invention are preferably coated with a polymeric binder material, also commonly known in the art as a "polymeric matrix" material. The terms "polymeric binder" and "polymeric matrix" are used interchangeably herein. These terms are conventionally known in the art and describe a material that binds fibers together either by way of its inherent adhesive characteristics or after being subjected to well known heat and/or pressure conditions. Such a "polymeric matrix" or "polymeric binder" material may also provide a fabric with other desirable properties, such as abrasion resistance and resistance to deleterious environmental conditions, so it may be desirable to coat the fibers with such a binder material even when its binding properties are not important, such as with woven fabrics.

When coating filaments/fibers with a polymeric binder, the polymeric binder coating is typically applied either simultaneously or sequentially to a plurality of fibers arranged as a fiber web (e.g. a parallel array or a felt) to form a coated web, as a woven fabric to form a coated woven fabric, or as another arrangement, wherein the fibers are thereby coated on, impregnated with, embedded in, or otherwise applied with the coating. The polymeric material may also be applied onto at least one array of fibers that is not part of a fiber web, followed by weaving the fibers into a woven fabric or followed by formulating a non-woven fabric following the methods described previously herein.

The fibers are preferably arranged into one or more fiber plies after the fibers are stretched and, if necessary, trimmed to the desired ply shape and size, and then multiple plies are aligned, stacked and consolidated following conventional techniques. In another technique, fibers are stretched, coated with a binder material, randomly arranged and consolidated to form a felt. Such techniques are well known in the art. When forming woven fabrics, the fibers are stretched prior to weaving and may be coated with the polymeric binder coating either prior to or after weaving, preferably after. Such techniques are well known in the art.

The woven or non-woven fabrics of the invention may be prepared using a variety of polymeric binder materials, including both low modulus, elastomeric materials and high modulus, rigid materials. As used herein throughout, the term tensile modulus means the modulus of elasticity as measured by ASTM 2256 for a fiber and by ASTM D638 for a polymeric binder material.

A low or high modulus binder may comprise a variety of polymeric and non-polymeric materials. A preferred polymeric binder comprises a low modulus elastomeric material. For the purposes of this invention, a low modulus elastomeric material has a tensile modulus measured at about 6,000 psi (41.4 MPa) or less according to ASTM D638 testing procedures. A low modulus polymer preferably has, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has a preferred elongation to break of at least about 50%, more preferably at least about 100% and most preferably has an elongation to break of at least about 300%.

A wide variety of materials and formulations having a low modulus may be utilized as the polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, and combinations thereof, and other low modulus polymers and copolymers curable below the melting point of the fiber. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. The most preferred low modulus polymeric binder polymer comprises styrenic block copolymers sold under the trademark KRATON® commercially produced by Kraton Polymers. The most preferred polymeric binder material comprises a polystyrene-polyisoprene-polystrene-block copolymer sold under the trademark KRATON®.

Preferred high modulus, rigid materials generally have a higher initial tensile modulus than 6,000 psi. Preferred high modulus, rigid polymeric binder materials useful herein include materials such as a vinyl ester polymer or a styrene-butadiene block copolymer, and also mixtures of polymers such as vinyl ester and diallyl phthalate or phenol formaldehyde and polyvinyl butyral. A particularly preferred rigid polymeric binder material for use in this invention is a thermosetting polymer, preferably soluble in carbon-carbon saturated solvents such as methyl ethyl ketone, and possessing a high tensile modulus when cured of at least about $1\times10^6$ psi (6895 MPa) as measured by ASTM D638. Particularly preferred rigid polymeric binder materials are those described in U.S. Pat. No. 6,642,159, the disclosure of which is incorporated herein by reference. The polymeric binder, whether a low modulus material or a high modulus material, may also include fillers such as carbon black or silica, may be extended with oils, or may be vulcanized by sulfur, peroxide, metal oxide or radiation cure systems as is well known in the art.

In addition to the non-woven fiber layers, the woven fiber layers are also preferably coated with the polymeric binder. Preferably the fibers comprising the woven fiber layers are at least partially coated with a polymeric binder, followed by a consolidation step similar to that conducted with non-woven fiber layers. Such a consolidation step may be conducted to merge multiple woven fiber layers with each other, or to further merge the binder with the fibers of said woven fabric. However, coating the woven fiber layers with a polymeric binder is not required. For example, a plurality of woven fiber layers do not necessarily have to be consolidated, and may be attached by other means, such as with a conventional adhesive, or by stitching.

Generally, a polymeric binder coating is necessary to efficiently merge, i.e. consolidate, a plurality of non-woven fiber plies. The polymeric binder material may be applied onto the entire surface area of the individual fibers or only onto a partial surface area of the fibers. Most preferably, the coating of the polymeric binder material is applied onto substantially all the surface area of each individual fiber forming a woven or non-woven fabric of the invention. Where the fabrics comprise a plurality of yarns, each fiber forming a single strand of yarn is preferably coated with the polymeric binder material. However, as is the case with woven fabric substrates, non-woven fabrics may also be coated with additional polymeric binder/matrix materials after the aforementioned consolidation/molding steps onto one or more surfaces of the fabric as may be desired by one skilled in the art.

The rigidity, impact and ballistic properties of the articles formed from the fabric composites of the invention are affected by the tensile modulus of the polymeric binder polymer coating the fibers. For example, U.S. Pat. No. 4,623,574 discloses that fiber reinforced composites constructed with elastomeric matrices having tensile moduli less than about 6,000 psi (41,300 kPa) have superior ballistic properties compared both to composites constructed with higher modulus polymers, and also compared to the same fiber structure without a polymeric binder material. However, low tensile modulus polymeric binder material polymers also yield lower rigidity composites. Further, in certain applications, particularly those where a composite must function in both anti-ballistic and structural modes, there is needed a superior combination of ballistic resistance and rigidity. Accordingly, the most appropriate type of polymeric binder polymer to be used will vary depending on the type of article to be formed from the fabrics of the invention. In order to achieve a compromise in both properties, a suitable polymeric binder may combine both low modulus and high modulus materials to form a single polymeric binder.

For the purposes of the present invention, the term "coated" as used herein is not intended to limit the method by which the polymer layers are applied onto the filament/fiber surface. Any appropriate application method may be utilized where the polymeric binder material layer is applied directly onto the fiber surfaces. Accordingly, the fibers of the invention may be coated on, impregnated with, embedded in, or otherwise applied with the polymeric binder material. The polymeric binder materials are preferably applied directly to the fiber or fibers using any appropriate method that would be readily determined by one skilled in the art. For example, the polymeric binder materials may be applied in solution form by spraying, extruding or roll coating a solution of the polymer material onto fiber surfaces, wherein a portion of the solution comprises the desired polymer or polymers and a portion of the solution comprises a solvent capable of dissolving or dispersing the polymer or polymers, followed by drying. Alternately, the polymeric binder material may be extruded onto the fibers using conventionally known techniques, such as through a slot-die, or through other techniques such as direct gravure, Meyer rod and air knife systems, which are well known in the art. Another method is to apply a neat polymer of the binder material onto fibers either as a liquid, a sticky solid or particles in suspension or as a fluidized bed. Alternatively, the coating may be applied as a solution, emulsion or dispersion in a suitable solvent which does not adversely affect the properties of fibers at the temperature of application. For example, the fibers can be transported through a solution of the polymeric binder material to substantially coat the fibers and then dried.

In another coating technique, the fibers may be dipped into a bath of a solution containing the polymeric binder material dissolved or dispersed in a suitable solvent, and then dried through evaporation or volatilization of the solvent. This method preferably at least partially coats each individual fiber with the first polymeric material, preferably substantially coating or encapsulating each of the individual fibers and covering all or substantially all of the filament/fiber surface area with the polymeric binder material. The dipping procedure may be repeated several times as required to place a desired amount of polymer material onto the fibers.

Other techniques for applying a coating to the fibers may be used, including coating of the gel fiber precursor before the fibers are subjected to the stretching operation, either before or after removal of the solvent from the fiber, as per the gel spinning technique. The fiber may is then stretched at elevated temperatures in accordance with the preferred process of the invention. The gel fiber may be passed through a solution of the appropriate coating polymer under conditions to attain the desired coating. Crystallization of the high molecular weight polymer in the gel fiber may or may not have taken place before the fiber passes into the solution.

Alternatively, the fibers may be extruded into a fluidized bed of an appropriate polymeric powder.

As stated herein, the fibers may be coated with the polymeric binder either prior to stretching the fibers or after stretching the fibers. Additionally, the fibers may be coated with the binder either before or after the fibers are arranged into one or more plies/layers, or before or after the fibers are woven into a woven fabric. Accordingly, it should be understood that in embodiments where the optional polymeric binder is incorporated, the invention is not intended to be limited by the stage at which the polymeric binder is applied to the fibers, nor by the means used to apply the polymeric binder.

Methods for the production of non-woven fabrics are well known in the art. In the preferred embodiments herein, a plurality of fibers are arranged into at least one array, typically being arranged as a fiber web comprising a plurality of fibers aligned in a substantially parallel, unidirectional array. In a typical process for forming non-woven unidirectionally aligned fiber plies, fiber bundles are supplied from a creel and led through guides and one or more spreader bars into a collimating comb, followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. At this point, scouring the fibers before or during this spreading step may enhance and accelerate the spreading of the fibers into such a parallel array. Fiber scouring is a process in which fibers (or fabric) are passed through a chemical solution which removes any of the undesirable residual fiber finish (or weaving aid) that may have been applied to the fibers during or after fabrication. Fiber scouring may also improve the bond strength of a subsequently applied polymeric binder material (or a subsequently applied protective film) on the fibers, and accordingly, less binder may be needed. By reducing amount of binder, a greater number of fibers may be included in a fabric, producing a lighter ballistic material with improved strength. This also leads to increased projectile engagement with the fibers, improved stab resistance of resulting fabric composites and an increased resistance of the composites against repeated impacts. Following fiber spreading and collimating, the fibers of such a parallel array typically contain from about 3 to 12 fiber ends per inch (1.2 to 4.7 ends per cm), depending on the filament/fiber thickness.

After the fibers are coated with the binder material as discussed herein, the coated fibers are formed into non-woven fabrics that comprise a plurality of overlapping, non-woven fiber plies that are consolidated into a single-layer, monolithic element. As stated previously, each ply comprises an arrangement of non-overlapping fibers that are aligned in a unidirectional, substantially parallel array. As used herein, a "single-layer" structure refers to monolithic structure composed of one or more individual fiber plies that have been consolidated into a single unitary structure. By "consolidating" it is meant that the polymeric binder coating and each fiber ply are combined together into a single unitary layer.

In a preferred non-woven fabric structure of the invention, a plurality of stacked, overlapping unitapes are formed wherein the parallel fibers of each single ply (unitape) are positioned orthogonally)(0°/90° to the parallel fibers of each adjacent single ply relative to the longitudinal fiber direction of each single ply. The stack of overlapping non-woven fiber plies is consolidated under heat and pressure, or by adhering the coatings of individual fiber plies, to form a single-layer, monolithic element which has also been referred to in the art as a single-layer, consolidated network where a "consolidated network" describes a consolidated (merged) combination of fiber plies with a polymeric matrix/binder. Articles of the invention may also comprise hybrid consolidated combinations of woven fabrics, non-woven fabrics formed from unidirectional fiber plies and non-woven felt fabrics.

As is conventionally known in the art, excellent ballistic resistance is achieved when individual fiber plies are cross-plied such that the fiber alignment direction of one ply is rotated at an angle with respect to the fiber alignment direction of another ply. Most preferably, the fiber plies are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

Most typically, non-woven fabrics include from 1 to about 6 plies, but may include as many as about 10 to about 20 plies as may be desired for various applications. The greater the number of plies translates into greater ballistic resistance, but also greater weight. Accordingly, the number of fiber plies forming a fabric or an article of the invention varies depending upon the ultimate use of the fabric or article. For example, in body armor vests for military applications, in order to form an article composite that achieves a desired 1.0 pound per square foot or less areal density (4.9 kg/m$^2$), a total of about 100 plies (or layers) to about 50 individual plies (or layers) may be required, wherein the plies/layers may be woven, knitted, felted or non-woven fabrics (with parallel oriented fibers or other arrangements) formed from the high-strength fibers described herein. In another embodiment, body armor vests for law enforcement use may have a number of plies/layers based on the National Institute of Justice (NIJ) Threat Level. For example, for an NIJ Threat Level IIIA vest, there may be a total of 40 plies. For a lower NIJ Threat Level, fewer plies/layers may be employed. The invention allows for the incorporation of a greater number of fiber plies to achieve the desired level of ballistic protection without increasing the fabric weight as compared to other known ballistic resistant structures.

Methods of consolidating fabrics or fiber plies are well known, such as by the methods described in U.S. Pat. No. 6,642,159. Consolidation can occur via drying, cooling, heating, pressure or a combination thereof. Heat and/or pressure may not be necessary, as the fibers or fabric layers may just be glued together, as is the case in a wet lamination process. Typically, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material is caused to melt, relatively little pressure is required to form the composite, while if the binder material is only heated to a sticking point, more pressure is typically required. As is conventionally known in the art, consolidation may be conducted in a calender set, a flat-bed laminator, a press or in an autoclave.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~121° C.). The pressure under which the fabrics of the invention are molded has a direct effect on the stiffness or flexibility of the resulting molded product. Particularly, the higher the pressure at which the fabrics are molded, the higher the stiffness, and vice-versa. In addition to the molding pressure, the quantity, thickness and composition of the fabric plies and polymeric binder coating type also directly affects the stiffness of the articles formed from the inventive fabrics. Most commonly, a plurality of orthogonal fiber webs are "glued" together with the binder polymer and run through a flat bed laminator to improve the uniformity and strength of the bond.

While each of the molding and consolidation techniques described herein are similar, each process is different. Particularly, molding is a batch process and consolidation is a continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber type. The fabrics of the invention may also optionally be calendered under heat and pressure to smooth or polish their surfaces. Calendering methods are well known in the art.

Woven fabrics may be formed using techniques that are well known in the art using any fabric weave, such as plain weave, crowfoot weave, basket weave, satin weave, twill weave and the like. Plain weave is most common, where fibers are woven together in an orthogonal 0°/90° orientation. Either prior to or after weaving, the individual fibers of each woven fabric material may or may not be coated with the polymeric binder material. In another embodiment, a hybrid structure may be assembled where both woven and non-woven fabrics are combined and interconnected, such as by consolidation as described herein.

To produce a fabric article having sufficient ballistic resistance properties, the total weight of the binder/matrix coating preferably comprises from about 2% to about 50% by weight, more preferably from about 5% to about 30%, more preferably from about 7% to about 15% and most preferably from about 11% to about 16% by weight of the fibers plus the weight of the coating, wherein 16% is most preferred for non-woven fabrics. A lower binder/matrix content is appropriate for woven fabrics, wherein a polymeric binder content of greater than zero but less than 10% by weight of the fibers plus the weight of the coating is most preferred.

The thickness of the individual fabrics will correspond to the thickness of the individual fibers and the number of fiber layers incorporated into a fabric. A preferred woven fabric will have a preferred thickness of from about 25 µm to about 500 µm per layer, more preferably from about 50 µm to about 385 µm and most preferably from about 75 µm to about 255 µm per layer. A preferred non-woven fabric, i.e. a non-woven, single-layer, consolidated network, will have a preferred thickness of from about 12 µm to about 500 µm, more preferably from about 50 µm to about 385 µm and most preferably from about 75 µm to about 255 µm, wherein a single-layer, consolidated network typically includes two consolidated plies (i.e. two unitapes). While such thicknesses are preferred, it is to be understood that other thicknesses may be produced to satisfy a particular need and yet fall within the scope of the present invention.

Following weaving or consolidation of the fiber layers, an optional polymer layer may be attached to each of the outer surfaces of the fabrics via conventional methods. Suitable polymers for said polymer layer non-exclusively include thermoplastic and thermosetting polymers. Suitable thermoplastic polymers non-exclusively may be selected from the group consisting of polyolefins, polyamides, polyesters, polyurethanes, vinyl polymers, fluoropolymers and co-polymers and mixtures thereof. Of these, polyolefin layers are preferred. The preferred polyolefin is a polyethylene. Non-limiting examples of polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred polyethylene is LLDPE. Suitable thermosetting polymers non-exclusively include thermoset allyls, aminos, cyanates, epoxies, phenolics, unsaturated polyesters, bismaleimides, rigid polyurethanes, silicones, vinyl esters and their copolymers and blends, such as those described in U.S. Pat. Nos. 6,846,758, 6,841,492 and 6,642,159, all of which are incorporated herein by reference to the extent not incompatible herewith. As described herein, a polymer film includes polymer coatings.

The polymer film layers are preferably attached to the single-layer, consolidated network using well known lamination techniques. Typically, laminating is done by positioning the individual layers on one another under conditions of sufficient heat and pressure to cause the layers to combine into a unitary film. The individual layers are positioned on one another, and the combination is then typically passed through the nip of a pair of heated laminating rollers by techniques well known in the art. Lamination heating may be done at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. If included, the polymer film layers preferably comprise from about 2% to about 25% by weight of the overall fabric, more preferably from about 2% to about 17% percent by weight of the overall fabric and most preferably from 2% to 12%. The percent by weight of the polymer film layers will generally vary depending on the number of fabric layers included. Further, while the consolidation and outer polymer layer lamination steps are described herein as two separate steps, they may alternately be combined into a single consolidation/lamination step via conventional techniques in the art.

The polymer film layers are preferably very thin, having preferred layer thicknesses of from about 1 μm to about 250 μm, more preferably from about 5 μm to about 25 μm and most preferably from about 5 μm to about 9 μm. The thickness of the individual fabric layers will correspond to the thickness of the individual fibers. While such thicknesses are preferred, it is to be understood that other film thicknesses may be produced to satisfy a particular need and yet fall within the scope of the present invention.

The fabrics of the invention also exhibit good peel strength. Peel strength is an indicator of bond strength between fiber layers. As a general rule, the lower the matrix polymer content, the lower the bond strength, but the higher the fragment resistance of the material. However, below a critical bond strength, the ballistic material loses durability during material cutting and assembly of articles, such as a vest, and also results in reduced long term durability of the articles. In the preferred embodiment, the peel strength for the inventive thin filament fabrics in a SPECTRA® Shield)(0°,90° type configuration is preferably at least about 0.17 lb/ft$^2$ for good fragment resistance, more preferably at least about 0.188 lb/ft$^2$, and more preferably at least about 0.206 lb/ft$^2$. It has been found that the best peel strengths are achieved for fabrics of the invention having at least about 11% to about 15% binder content.

The fabrics of the invention will have a preferred areal density of from about 20 grams/m$^2$ (0.004 lb/ft$^2$ (psf)) to about 1000 gsm (0.2 psf). More preferable areal densities for the fabrics of this invention will range from about 30 gsm (0.006 psf) to about 500 gsm (0.1 psf). The most preferred areal density for fabrics of this invention will range from about 50 gsm (0.01 psf) to about 250 gsm (0.05 psf). Articles of the invention comprising multiple individual layers of fabric stacked one upon the other will further have a preferred areal density of from about 1000 gsm (0.2 psf) to about 40,000 gsm (8.0 psf), more preferably from about 2000 gsm (0.40 psf) to about 30,000 gsm (6.0 psf), more preferably from about 3000 gsm (0.60 psf) to about 20,000 gsm (4.0 psf), and most preferably from about 3750 gsm (0.75 psf) to about 10,000 gsm (2.0 psf).

The fabrics of the invention may be used in various applications to form a variety of different ballistic resistant articles using well known techniques. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in a military and peace keeping missions.

As used herein, "soft" or "flexible" armor is armor that does not retain its shape when subjected to a significant amount of stress. The structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as unattached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus binder material. Hard articles like helmets and armor are preferably, but not exclusively, formed using a high tensile modulus binder material.

Ballistic resistance properties are determined using standard testing procedures that are well known in the art. Particularly, the protective power or penetration resistance of a ballistic resistant composite is normally expressed by citing the impacting velocity at which 50% of the projectiles penetrate the composite while 50% are stopped by the composite, also known as the $V_{50}$ value. As used herein, the "penetration resistance" of an article is the resistance to penetration by a designated threat, such as physical objects including bullets, fragments, shrapnel and the like. For composites of equal areal density, which is the weight of the composite divided by its area, the higher the $V_{50}$, the better the ballistic resistance of the composite.

The penetration resistance for designated threats can also be expressed by the total specific energy absorption ("SEAT") of the ballistic resistant material. The total SEAT is the kinetic energy of the threat divided by the areal density of the composite. The higher the SEAT value, the better the resistance of the composite to the threat. The ballistic resistant properties of the articles of the invention will vary depending on many factors, particularly the type of fibers used to manufacture the fabrics, the percent by weight of the fibers in the composite, the suitability of the physical properties of the coating materials, the number of layers of fabric making up the composite and the total areal density of the composite.

The following examples serve to illustrate the invention:

Example 1

To prepare high modulus fibers in accordance with the invention, a 60 filament bundle was gel spun and assembled. The denier of the 60 filament bundle was 650 (10.83 dpf). The 60 filament bundle was then subjected to a first drawing step, i.e. a single pass, double draw process according to the methods described in Example 1 of U.S. Pat. No. 7,344,668, thereby reducing the denier of the filament bundle to 215 (3.58 dpf). The 60 filament bundle was then subjected to a second drawing step, i.e. another double pass, single draw process according to the methods described in Example 1 of U.S. Pat. No. 7,344,668, thereby reducing the denier of the filament bundle to 163 (2.71 dpf).

Example 2

The steps of Example 1 were repeated to assemble a bundle including 480 individual filaments and having a denier of 1300 (2.71 dpf). This bundle is identified in Table 1 as "HMF Fiber." The resulting fibers had a tenacity of 39 g/denier and a tensile modulus of 1449 g/denier.

Examples 3 and 4 (Comparative), and Example 5

Ballistic shoot packs were prepared from three different varieties of high modulus polyethylene fibers, identified in Table 1 as "Standard Fiber", "PLUS Fiber" and "HMF Fiber" in Table 1 for testing of the ballistic resistance properties of each fabric type. The Standard Fibers were high tenacity, multifilament polyethylene fibers having a tenacity of 34.3 and stretched to a denier per filament of 5.4. The PLUS Fibers were high tenacity, multifilament polyethylene fibers having a tenacity of 36 and stretched to a denier per filament of 4.6. Each of the Standard Fibers and PLUS Fibers were supplied by Honeywell International Inc. of Morristown, N.J. The HMF fibers were the high tenacity, multifilament polyethylene fibers of the invention as identified in Example 2. The measured properties for all three fiber types are listed in Table 1. A comparison of each listed property for each fiber type is shown.

Prior to forming the shoot packs, fiber layers were cut from continuous laminated sheets of material that comprised two consolidated plies of unidirectional fibers of each fiber type impregnated with a polymeric binder composition comprising Kraton® D1107 thermoplastic binder resin commercially available from Kraton Polymers of Houston, Tex. Each fiber layer contained 21 wt. % of the Kraton® D1107 binder material based on the weight of the fibers plus the weight of the binder resin. Prior to coating the fibers with the binder and prior to forming the fiber layers, the fibers may optionally be corona treated to improve the inter-fiber adhesion between adjacent fibers. In Examples 3-5, the PLUS Fibers were corona treated, but the Standard Fibers and HMF Fibers were not corona treated.

The two fiber plies of each layer were cross-plied such that the fibers of one ply were oriented at a right angle to the fibers of the second ply relative to the longitudinal fiber direction of each fiber ply (conventional 0°/90° configuration). The plies were laminated between two linear low density polyethylene (LLDPE) films, each having a thickness of 9 μm and an areal density of 8 g/m². The lamination process included pressing the LLDPE films onto the cross-plied material at 110° C., under 200 psi (1379 kPa) pressure for 30 minutes, thereby forming a continuous laminated sheet of material having a thickness of 0.06" (1.524 mm). The sheet of the Standard Fiber fabric was cut to form two separate layers, each having a length and width of 18"×18" (45.7 mm×45.7 mm), and the total areal density of one fabric layer was 150 gsm. The sheet of the PLUS Fiber fabric was cut to form two separate layers, each having a length and width of 18"×18" (45.7 mm×45.7 mm), and the total areal density of one fabric layer was 113 gsm. The sheet of the HMF Fiber fabric was cut to form eight separate layers, each having a length and width of 18"×18" (45.7 mm×45.7 mm), and the total areal density of one fabric layer was 150 gsm. For each sample, the layers were then loosely stacked together to form the shoot pack. The layers were not bonded to each other. The areal density of each shoot pack was 3.66 kg/m².

TABLE 1

| Fibers (Fabric Density) | Denier Per Filament | Tenacity (g/d) | % Difference | Modulus (g/d) | % Difference | UTE* | % Difference |
|---|---|---|---|---|---|---|---|
| Standard Fiber (1300 denier, 240 filaments) | 5.4 | 34.3 | Control | 1179 | Control | 3.4% | Control |
| PLUS Fiber (1100 denier, 240 filaments) | 4.6 | 36 | (+) 4.9% | 1222 | (+) 3.6% | 3.3% | (−) 2.9% |
| HMF Fiber (1300 denier, 480 filaments) | 2.7 | 39 | (+) 13.7% | 1449 | (+) 22.9% | 3.2% | (−) 5.9% |

*UTE = Ultimate Tensile Strength

The ballistic resistance of each two-ply layer was tested against a 9 mM Full Metal Jacket (FMJ) projectile, a 17 grain FSP fragment, and an M80 rifle bullet. The results of this ballistic testing is summarized in Tables 2-4, respectively.

For testing against fragment resistance, each shoot pack was mounted on a test frame and firmly clamped at the top of the frame. The frame was mounted at a 90-degree orientation to the line of fragment fired from a firmly mounted universal receiver. A 17 grain Fragment Simulating Projectile was used for testing and conformed to the shape, size and weight as per the MIL-P-46593A. $V_{50}$ ballistic testing was conducted in accordance with the procedures of MIL-STD-662E to experimentally determine the velocity at which a bullet has a 50 percent chance of penetrating the test object.

Several 17 grain FSP fragments were fired against each shoot pack, changing the velocity of each fragment. The velocity of each fragment was moved down and up depending whether the previous fragment shot was a complete penetration or partially penetrated a few layers of the shoot pack. An average velocity was achieved by including a minimum of four partial penetrations and four complete fragment penetrations within a velocity spread of 125 fps (38.1 mps). The average velocity of the eight partial and complete penetrations was calculated and called $V_{50}$. The $V_{50}$ of each shoot pack was calculated and is listed in Table 2. The Specific Energy Absorption of the Target (SEAT) was also calculated and is also identified in Table 2.

TABLE 2

17 grain FSP fragment (Hard armor) Performance

| Example Number | Fibers (Fabric Density) | FAD | % Resin | $V_{50}$ | SEAT | % Change SEAT |
|---|---|---|---|---|---|---|
| 3 (Comp.) | Standard Fiber (1300 denier, 240 filaments) | 52.5 | 21 | 1733 | 31.2 | Control |
| 4 (Comp.) | PLUS Fiber (1100 denier, 240 filaments) | 40 | 21 | 1821 | 34.5 | (+) 10.6% |
| 5 | HMF Fiber (1300 denier, 480 filaments) | 52.5 | 21 | 1925 | 38.5 | (+) 23.5% |

Examples 6 and 7 (Comparative), and Example 8

Additional shoot packs as described in Examples 3-5 were fabricated and were tested against a 9 mm Full Metal Jacket bullet (bullet weight: 124 grain). For testing against 9 mm FMJ bullet resistance, the shoot packs were mounted on a test frame filled with Plastilina #1 clay and strapped on the frame. The Plastilina filled frame was mounted at a 90-degree orientation to the line of fragment fired from a firmly mounted universal receiver. The 9 mm FMJ bullet used for testing confirmed the shape, size and weight as per the National Institute of Justice (NIJ) 0101.04 test standard. The $V_{50}$ and SEAT of each shoot pack were calculated and are listed in Table 3.

TABLE 3

9 MM FMJ, LCR (soft armor) Performance

| Example Number | Fibers (Fabric Density) | FAD | % Resin | $V_{50}$ | SEAT | % Change SEAT |
|---|---|---|---|---|---|---|
| 6 (Comp.) | Standard Fiber (1300 denier, 240 filaments) | 52.5 | 21 | 1484 | 222 | Control |
| 7 (Comp.) | PLUS Fiber (1100 denier, 240 filaments) | 40 | 21 | 1565 | 247 | (+) 12.2% |
| 8 | HMF Fiber (1300 denier, 480 filaments) | 52.5 | 21 | 1582 | 252 | (+) 13.5% |

Examples 9 and 10 (Comparative), and Example 11

Additional shoot packs as described in Examples 3-5 were fabricated and were tested against a high power rifle US military M80 ball bullet (weight: 9.65 g) according to US Military standard MIL-STD-662F. The $V_{50}$ and SEAT of each shoot pack were calculated and are listed in Table 4.

TABLE 4

M80 rifle bullet (Hard armor) Performance

| Example Number | Fibers (Fabric Density) | FAD | % Resin | $V_{50}$ | SEAT | % Change SEAT |
|---|---|---|---|---|---|---|
| 9 (Comp.) | Standard Fiber (1300 denier, 240 filaments) | 52.5 | 21 | 2196 | 126 | Control |
| 10 (Comp.) | PLUS Fiber (1100 denier, 240 filaments) | 40 | 21 | 2691 | 189 | (+) 50% |
| 11 | HMF Fiber (1300 denier, 480 filaments) | 52.5 | 21 | 2907 | 220 | (+) 75% |

As shown by Examples 5, 8 and 11, fabrics formed from the fibers of the present invention have superior ballistic penetration resistance than the known fabrics from Comparative Examples 3-4, 6-7 and 9-10, regardless of the ballistic threat.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A ballistic resistant composite comprising at least one layer of interconnected fibers, said fibers optionally having a polymeric binder material thereon, said optional binder material substantially coating the outer surfaces of each of the fibers and interconnecting said fibers, which fibers comprise monofilament fibers and/or multifilament fibers, said fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/m².

2. The ballistic resistant composite of claim 1 wherein said fibers comprise polyethylene fibers.

3. The ballistic resistant composite of claim 1 wherein said fibers comprise drawn fibers.

4. The ballistic resistant composite of claim 1 wherein said fibers comprise drawn polyethylene fibers.

5. The ballistic resistant composite of claim 4 wherein said fibers comprise monofilament fibers and/or multifilament fibers having a diameter of from about 1 denier per filament to about 3.0 denier per filament, a tenacity of from about 37 grams per denier to about 45 grams per denier, a tensile modulus of from about 1400 grams per denier to about 3000 grams per denier, an elongation to break of at least about 2% and a fiber areal density of from about 5 grams/m² to about 35 grams/m².

6. The ballistic resistant composite of claim 1 wherein said at least one layer comprises a plurality of interconnected monofilament fibers only, a plurality of interconnected multifilament fibers only or a combination of interconnected monofilament fibers and multifilament fibers.

7. The ballistic resistant composite of claim 1 wherein said fibers comprise monofilament fibers.

8. The ballistic resistant composite of claim 1 wherein said binder material comprises an elastomer and comprises from about 7% to about 15% by weight of said at least one layer of interconnected fibers.

9. The ballistic resistant composite of claim 1 wherein said at least one layer of interconnected fibers comprises a plurality of substantially parallel fibers.

10. A ballistic resistant fabric formed from a plurality of layers of interconnected fibers, said fabric comprising a plurality of non-woven fiber layers, each fiber layer comprising a plurality of fibers arranged in a substantially parallel array, said fibers comprising monofilament fibers and/or multifilament fibers, said fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/m², said fibers having a polymeric binder material thereon, said binder material substantially coating the outer surfaces of each of the fibers and interconnecting said fibers, wherein each non-woven fiber layer has a fiber areal density of from about 5 g/m² to about 35 g/m², and wherein the fabric has an areal density of less than about 75 g/m².

11. The ballistic resistant fabric of claim 10 wherein said fibers comprise monofilament fibers and/or multifilament fibers having a diameter of from about 1 denier per filament to about 3.0 denier per filament, a tenacity of from about 37 grams per denier to about 45 grams per denier, a tensile modulus of from about 1400 grams per denier to about 3000 grams per denier, an elongation to break of at least about 2% and a fiber areal density of from about 5 grams/m² to about 35 grams/m².

12. The ballistic resistant fabric of claim 10 wherein said fibers comprise drawn polyethylene fibers.

13. The ballistic resistant fabric of claim 10 wherein said at least one layer comprises a plurality of interconnected monofilament fibers only, a plurality of interconnected multifilament fibers only or a combination of interconnected monofilament fibers and multifilament fibers.

14. The ballistic resistant fabric of claim 10 wherein said binder material comprises an elastomer and comprises from about 7% to about 15% by weight of said at least one layer of interconnected fibers.

15. The ballistic resistant fabric of claim 10 wherein said fabric comprises a plurality of cross-plied and consolidated non-woven fiber layers, wherein said fabric has at least two outer surfaces and wherein at least one layer of a polymer film is attached to at least one of said outer surfaces.

16. A ballistic resistant article formed from the ballistic resistant fabric of claim 10.

17. A method of producing a ballistic resistant material from a plurality of layers of high strength fibers, the method comprising:
  a) forming at least two fiber layers, each fiber layer comprising a plurality of fibers aligned in a substantially parallel, unidirectional array;
  b) drawing one or more of said fibers under conditions sufficient to reduce the diameter of said fibers, producing drawn fibers having a diameter of less than about 4.6 denier per filament, a tenacity of at least about 37 grams per denier, a tensile modulus of at least about 1400 grams per denier, an elongation to break of at least about 2% and a fiber areal density of at least about 5 grams/m$^2$;
  c) after both steps a) and b) are completed, coating said fibers with a polymeric binder material such that said binder material substantially coats the outer surfaces of each of the fibers and interconnects said fibers; and thereafter
  d) consolidating said fiber layers to form a ballistic resistant material.

18. The method of claim 17 wherein the fiber layers are formed in step a) before the one or more fibers are drawn in step b).

19. The method of claim 17 wherein the one or more fibers are drawn in step b) before the fiber layers are formed in step a).

20. The method of claim 17 wherein said fibers are drawn through one or more drawing apparatuses at least twice and are thereby subjected to multiple, sequential drawing steps.

* * * * *